United States Patent Office 3,406,038
Patented Oct. 15, 1968

3,406,038
TREATMENT OF WOOD WITH A POLYHYDRIC ALCOHOL AND AN ALKYLENE OXIDE
Rolf Erhard Moren, Alfredsham, Sweden, assignor to Mo och Domsjo Aktiebolag, Ornskoldsvik, Sweden, a corporation of Sweden
No Drawing. Continuation-in-part of application Ser. No. 315,359, Oct. 10, 1963. This application June 10, 1966, Ser. No. 556,783
Claims priority, application Sweden, Oct. 15, 1962, 11,029/62
13 Claims. (Cl. 117—62.1)

This application is a continuation-in-part of application Ser. No. 315,359, filed Oct. 10, 1963, and now abandoned.

The present invention relates to a method of impregnating wood in order to improve its dimensional stability and to protect it from attack by insects, fungi and microorganisms, and to the wood product produced thereby.

One of the best known methods of both protecting wood from attacks of the types referred to and preventing swelling, shrinkage and cracking is described in Swedish Patent No. 157,302 which relates to a method of preserving wood by impregnating it with solutions, dispersions or emulsions of insecticidal or fungicidal agents comprising a water-soluble polyalkylene glycol or a lower alkyl ether thereof. Treatment of wood with liquid or solid polyalkylene glycols is rendered difficult, however, by the fact that the rate of diffusion in the wood is low, above all at normal pressures, which results in the time of treatment being long, often several weeks. If one carries out the treatment under superatmospheric pressure, the wood, to be able to take up impregnating liquid, must first be dried to air dryness, which as a rule implies a moisture ratio below 25%. The "moisture ratio" refers to the amount of water in the wood in percent of the absolute dry weight of the wood. In the subsequent impregnation of the wood under increased pressure with polyalkylene glycol, a more rapid swelling occurs in those portions of the wood which have grown more rapidly, than in the other portions, wherefore the material often becomes warped unless a very long time of treatment is selected.

In U.S. Patent No. 3,183,114 to Chein Liu et al., dated May 11, 1965, a method is disclosed for treating wood to enhance its dimensional stability and resistance to deterioration wherein the wood is treated with gaseous ethylene oxide or propylene oxide, and then with a vapor phase acid anhydride. Ethylene oxide and propylene oxide react with water to form the corresponding glycol, so that if the moisture content of the wood is high, much of the impregnant oxide can be used up in this way, and is thus prevented from reacting with the wood and other wood components, and from forming polymerization products. On the other hand, if the wood is dried first, it will warp, shrink and check, because it has not been stabilized. Therefore Chien Liu must treat a wood which has not been appreciably dried, and such wood treated only by alkenylene oxide contains a relatively low amount of polymeric substances formed in situ therein.

Furthermore, after forming the glycol, Chien Liu reacts the wood and the glycol with a vapor phase acid anhydride to effect esterification and cross-linking reactions, and obtain improved dimensional stability and resistance to deterioriation, because these properties cannot always be obtained by reaction with the alkylene oxide alone.

The present invention provides a method of impregnating wood which can be carried out without previously shrinking the wood, and results in a wood product containing large amounts of stabilizing polyalkylene polyols and other polymeric substances, and having a uniform distribution of such substances therein. The method of this invention also has the advantage that drying of the wood, if desired, can be effected simultaneously with practice of the method.

The method also makes it possible to surface-treat green wood before drying, to avoid checks and reduce shrinking during processing and drying. The process is easily applicable to wood in bulk, since it does not require thorough impregnation but only a surface treatment.

Furthermore, the invention makes it possible to stabilize woods which cannot be pressure impregnated, such as spruce, since it achieves this by only a surface-impregnation.

The method of the instant invention for treating wood to improve its dimensional stability and resistance to deterioration, comprises impregnating the wood to be treated with a polyhydric alcohol having up to three hydroxyl groups, then impregnating the wood with an alkylene oxide, and effecting reaction in situ in the wood of the alkylene oxide with the polyhydric alcohol, with water with itself, and with organic wood components reactive therewith, thereby forming in situ polyoxyalkylene polylols and other polymeric substances which improve the dimensional stability of the wood under variations in temperature and humidity, and improved its resistance to deterioration.

The method of the invention also contemplates an impregnation that is restricted primarly to the surface of the wood of the polyhydric alcohol by restricted application of the polyhydric alcohol. While the alkylene oxide applied thereafter may not be restricted to the surface of the wood, the reactions with which the invention is concerned are so restricted, due to the fact that the polyhydric alcohol is present only there, and the result is a surface treatment.

Although the method of this invention can be carried out on previously dried wood, which thereupon need not be dried further upon the polymerization, the method is best applied to moist wood wherein drying can be carried out during the treatment of the wood with polyhydric alcohol and thereafter, with the remarkable advantage that the treated wood does not become warped during drying, that the drying operation can be carried further than otherwise possible without any danger of checking, and that the drying process need not be put off until after the application of alkylene oxides to the wood as in the Chien Liu process.

Suitable alkylene oxides for use in the instant invention include, for example, ethylene oxide, propylene oxide and butylene oxide.

Suitable polyhydric alcohols which are reactive with the alkylene oxides, and thus can be used herein as impregnating agents, include polyhydric alcohols having up to three hydroxyl groups and up to ten carbon atoms, and monoethers thereof, such as, for example, ethylene glycol, diethylene glycol, triethylene glycol, propylene glycol, polyalkylene glycols having a molecular weight up to about 1500, such as polyoxyethylene glycol, and polyoxypropylene glycol, glycerol, ethylene glycol monoethyl ether and diethylene glycol monoethyl ether and triethylene glycol monoethyl ether.

The polyhydric alcohol and the alkylene oxide can be employed in liquid form. However, gaseous alkylene oxides are preferred since they have a considerably greater rate of diffusion into the wood than liquid alkylene oxides and thus, one obtains a more uniform distribution thereof in the wood in a considerably shorter time than when liquids are employed. The alkylene oxide also can be applied dissolved in a suitable solvent inert to the wood to be treated, such as dimethyl sulfoxide and diacetone alcohol.

The polyhydric alcohol can be applied per se, or in solution in a solvent such as water or an organic water-miscible solvent such as diacetone alcohol, ethanol, acetone, dimethyl sulfoxide, and methanol. The concentration can range from 5 to 95% by weight of polyol, but preferably at least 50% polyol. The impregnation is best carried out by dipping or spraying with the polyol or solution thereof. The temperature is not critical. Room temperature is convenient. Temperatures from 10° to 70° C. are preferred.

The time required depends upon the amount to be introduced. To shorten the time, vacuum and pressure impregnation can be used. From about 0.05 to about 30% and preferably from 3 to 20% polyol is introduced, depending upon the degree of stabilization required. The wood is eventually brought to a moisture ratio of up to 20% either before or after polyol is introduced.

After the polyol has been introduced, if the wood has not previously been dried below the fiber saturation point, the wood is then dried, in a kiln, or in air. The wood can be but need not be dried in the hot. The drying can be carried out without danger of checking or warping due to the polyol content.

The alkylene oxide can be applied to the wood under vacuum, at atmospheric pressure or at a subatmospheric or superatmospheric pressure. Suitable pressures are within the range of 0.01 to 200 atmospheres, and preferably within the range from about 2 to about 20 atmospheres.

The reaction of the alkylene oxide with the polyhydric alcohol, with water, with itself, and with other components in the wood can be carried out at temperatures within the range from about 0° C. to about 160° C., but temperatures within the range from about 60° C. to about 100° C. are preferred.

The quantity of alkylene oxide introduced depends primarily on the desired effect, but in general an amount within the range from about 0.5 to about 50%, based on the dry weight of wood, is suitable. The preferred amount of alkylene oxide is within the range from 1 to about 25%.

The alkylene oxide and polyhydric alcohol should be employed in a weight ratio to one another alkylene oxide: polyhydric alcohol within the range from about 1:10 to about 10:1, and preferably from about 1:4 to about 4:1.

One embodiment of this invention comprises pretreating the wood with polyhydric alcohol, drying the wood, removing air from the wood by a brief vacuum treatment, and thereafter impregnating the wood with an alkylene oxide under an elevated pressure and temperature. The alkylene oxide thus is caused to react with the polyhydric alcohol, with any water present in the wood, and with other organic substances present in the wood which are reactive with alkylene oxides, to form substances which possess the property of reducing the dimensional changes of the wood at varying temperature and atmospheric humidity.

The polymerization of the alkylene oxide can be carried out without other auxiliary agents, but in some cases it may be suitable to use a catalyst. In that case, the catalyst can be supplied to the wood together with the alkylene oxide, but in certain cases it is suitable to introduce it into the wood before the introduction of the alkylene oxide, such as prior to or during the pretreatment of the wood with the polyhydric alcohol. Several useful catalysts for the polymerization of alkylene oxides are known, such as dilute aqueous sodium, potassium or ammonium hydroxide, but for a gaseous reaction a catalyst which is gaseous at the reaction temperature is preferred. Suitable catalysts are boron trifluoride, ammonia, and primary, secondary or tertiary amines, such as monoethylamine, dimethylamine, trimethylamine, triethylamine, pyridine, piperidine and morpholine. Among these, tertiary amines are preferred.

After the polymerization step, it may in many cases be suitable to carry out a subsequent treatment under vacuum to remove any remaining volatile reaction products.

The treatment of this invention may be combined with treatment with known fungicidal, insecticidal or fire-retarding agents, such as creosote oil, copper naphthenates, pentachlorophenol, phenol, organotin compounds such as organotin salts of 2-ethylhexoic acid, nitrophenols, halogenated naphthalene derivatives, quinoline compounds such as 8-hydroxyquinoline, Tanalith (25% NaF, 25% $Na_2HAsO_4$, 37.5% $Na_2CrO_4$, 12.5% dinitrophenol), Boliden K33 (34% $As_2O_5$, 26.6% $Cr_2O_3$, 14.8% CuO, 24.6% $H_2O$), copper sulfate, zinc chloride, mercury chloride, and sodium, potassium and ammonium borates, phosphates and acetates.

Such agents can be applied to the wood prior to, simultaneously with or after the polymerization treatment steps. In the same way, the wood can also be treated with coloring agents prior to, simultaneously with or after the polymerization steps. Suitable coloring agents are such as are conventional in wood staining compositions, e.g., Trimpo dyestuffs, chrysoidin, vesuvine and malachite green.

One of the advantages of the method of this invention is that even dried wood, e.g. planed or otherwise worked wood members having a moisture ratio of about 0 to 12%, can be impregnated without water having to be supplied in the treatment.

By means of the method of this invention it is also possible to impregnate sprucewood, which has previously not been possible without a preceding time-consuming steam treatment procedure on account of the special cell structure of sprucewood and the high degree of polymerization of the spruce cellulose as compared to other types of wood.

The method of this invention is also especially advantageous for the impregnation of wood having a low moisture content, since in that case one obtains a better yield of the alkylene oxide and a smaller amount of volatilized polyhydric alcohol as a by-product.

The method of this invention may also be applied to treat growing trees by causing the polyhydric alcohol and alkylene oxide to diffuse into the wood by natural diffusion or by the aid of pressure. In this case too, a solvent can be used such as dimethyl sulfoxide.

The following examples in the opinion of the inventor represent the preferred embodiments of this invention.

Example 1

Six pieces of freshly sawed pine board of dimensions 1 x 7 x 12 inches having an average moisture ratio of 30% by weight were surface treated by dipping the pieces in diethylene glycol for 30 seconds. The samples were then dried in an oven at 50° C., 25% relative humidity, for 72 hours. The treated samples absorbed an average of 6.5% by weight diethylene glycol, based on the dry weight of wood, and had an average moisture ratio of 5%.

The dried diethylene glycol treated wood was then introduced into a pressure cylinder and subjected to a vacuum of 10 mm. Hg at 20° C. Gaseous propylene oxide at a pressure of 4 kg./cm.$^2$ and a temperature of 120° C. was then introduced into the pressure cylinder, and the wood was impregnated therewith for 8 hours. The propylene oxide was taken up in an amount of about 15% by weight based on the weight of dry wood, and reacted with the diethylene glycol therein to form poly mixed oxyethylene oxypropylene glycols in the wood. After drying at 50° C. to a constant weight, a tangential shrinking of 0.9% and a radial shrinking of 0.8% as compared to the initial measurement was determined. There was no longitudinal change or sign of checks in the treated wood pieces.

As a first control, untreated wood pieces of the same size and grade as treated above and having an average moisture ratio of 30%, was dried as before. The dried wood was found to have several checks and to have shrunk as follows, as compared to the initial measurements:

| | Percent |
|---|---|
| Tangential shrinkage | 5.2 |
| Radial shrinkage | 4.1 |
| Longitudinal shrinkage | 0.1 |

As a second control, six pieces of the same freshly sawed pine board were dried in an oven at 50° C., 25% relative humidity, for 72 hours, to a moisture ratio of about 5%. The boards were then examined, and were found to have an average of 6 end-checks and 3 longitudinal checks in each piece. The dried wood pieces were then introduced into a pressure cylinder, and were impregnated with the same amount of propylene oxide used above and then dried as before. About 12% of propylene oxide was absorbed in the wood, and reacted to form polymeric compounds therein. After drying at 50° C. to constant weight, the following shrinkage values were found, as compared to the initial dimensions:

| | Percent |
|---|---|
| Tangential shrinkage | 2.8 |
| Radial shrinkage | 2.5 |
| Longitudinal shrinkage | 0.1 |

In addition, the treated pieces of wood had an average of 2 checks each.

Accordingly, it is clearly seen that after pretreatment with diethylene glycol and impregnation with propylene oxide, ¼ more propylene oxide is absorbed into the wood, as compared to wood impregnated only with propylene oxide and without pretreatment with diethylene glycol. In addition, the wood pretreated with diethylene glycol and then impregnated with propylene oxide had a higher degree of dimensional stability than untreated wood or wood only impregnated with propylene oxide.

Impregnation in accordance with this example is useful for finished machined wood members which can thereupon be directly assembled, and if desired, subjected to surface finishing treatment.

Example 2

Six pieces of beechwood of dimensions 1 x 7 x 12 inches having an average moisture ratio of 30% by weight were surface treated by dipping the pieces in diethylene glycol for 3 minutes, and were thereafter dried as in Example 1. The treated pieces absorbed an average of 8% by weight polyethylene glycol 200 molecular weight, based on the dry weight of the wood, and had an average moisture ratio of below 4%, and were free of checks.

The dried treated wood was then introduced into a pressure cylinder and subjected to a vacuum of 10 mm. at 20° C. The wood was then subjected to impregnation by gaseous ethylene oxide at a pressure of 15 kg./cm.$^2$ at a temperature of 110° C. for 4 hours, with trimethylamine as a catalyst in an amount of about 0.2% based on the weight of the dry wood. The ethylene oxide was taken up by the treated wood in an amount of about 35%, based on the weight of the dry wood, and reacted with polyethylene glycol therein to form polyoxyethylene glycols. After drying at 50° C. to a constant weight, a tangential shrinkage of 0.2% as compared to the initial measurement was found. No radial or longitudinal change or signs of checks in the treated beechwood had occurred.

As a control, untreated beechwood pieces of the same size and grade as above, and having an average moisture ratio of 30% were dried under the same conditions as above. The pieces showed several checks, and the following dimensional changes, as compared to the initial measurements:

| | Percent |
|---|---|
| Tangential shrinkage | 6 |
| Radial shrinkage | 4 |
| Longitudinal shrinkage | 0 |

Six pieces of the same beechwood were dried in an oven as above, and were then found to have several checks. The dried wood pieces were then introduced into a pressure cylinder, and were impregnated with ethylene oxide under the above conditions and then dried. About 31% of ethylene oxide was absorbed in the wood.

After drying at 50° C. to constant weight, the following shrinkage values were noted, as compared to the initial dimensions:

| | Percent |
|---|---|
| Tangential shrinkage | 2.2 |
| Radial shrinkage | 1.7 |
| Longitudinal shrinkage | 0.1 |

Accordingly, it is clearly seen that after pretreatment with polyoxyethylene glycol and impregnation with ethylene oxide more ethylene oxide is absorbed, as compared to wood impregnated only with ethylene oxide and without pretreatment with polyoxyethylene glycol. In addition, the wood pretreated with polyoxyethylene glycol, had a higher degree of dimensional stability than untreated wood, or wood only impregnated with ethylene oxide.

Having regard to the foregoing disclosure, the following is claimed as the inventive and patentable embodiments thereof:

1. A method of impregnating wood to improve its dimensional stability and resistance to deterioration, which comprises, in either order, applying to the wood a polyhydric alcohol having up to three hydroxyl groups, and drying the wood to a moisture ratio up to 20%; and thereafter applying to the wood an alkylene oxide and effecting reaction of the alkylene oxide with the polyol, with water, with itself, and with organic wood components reactive therewith, thereby forming in situ polymeric substances which improve the dimensional stability of the wood and its resistance to deterioration.

2. A method as in claim 1 in which the alkylene oxide is selected from the group consisting of liquid and gaseous ethylene oxide, propylene oxide, butylene oxide and solutions thereof.

3. A method as in claim 1 including the step of applying a vacuum to the wood to be treated to remove air therefrom prior to the application of the alkylene oxide.

4. A method as in claim 1 in which said alkylene oxide is supplied in an amount such that the alkylene oxide reaction product remaining in the wood after the reaction amounts to between 0.5 to 50%.

5. A method as in claim 1 in which said reaction is carried out at a temperature within the range from 0° C. to 160° C.

6. A method as in claim 1 in which said reaction is carried out at a pressure within the range from 0.01 to 200 atmospheres.

7. A method as in claim 1 in which said reaction is carried out in the presence of a catalyst capable of catalyzing the polymerization of alkylene oxides.

8. A method as in claim 1 in which the polyhydric alcohol is selected from the group consisting of polyhydric alcohols and monoethers thereof.

9. A method as in claim 1 in which the polyhydric alcohol is ethylene glycol.

10. A method as in claim 1 in which the polyhydric alcohol is diethylene glycol.

11. A method as in claim 1 in which the polyhydric alcohol is glycerol.

12. A method as in claim 1 in which the polyhydric alcohol is polyoxyethylene glycol.

13. A method as in claim 1 which also comprises the step of impregnating the wood with a substance selected from the class consisting of fungicidal, insecticidal, fire-retarding and coloring substances.

References Cited

UNITED STATES PATENTS

| | | | |
|---|---|---|---|
| 1,638,440 | 8/1927 | Howald | 117—147 X |
| 1,985,597 | 12/1934 | Calcott et al. | 117—147 |
| 2,181,264 | 11/1939 | Dreyfus | 8—120 X |
| 2,533,145 | 12/1950 | Schroger | 162—146 |
| 2,629,674 | 2/1953 | Ericks | 8—115.6 |
| 2,643,957 | 6/1953 | Lindgren | 117—147 X |
| 2,658,850 | 11/1953 | Cislak | 117—152 X |
| 2,931,737 | 4/1960 | Thornton | 117—152 X |
| 3,183,114 | 5/1965 | Liu et al. | 117—62.2 |

WILLIAM D. MARTIN, *Primary Examiner.*

T. G. DAVIS, *Assistant Examiner.*